(12) United States Patent
Ogino et al.

(10) Patent No.: US 7,549,197 B2
(45) Date of Patent: Jun. 23, 2009

(54) BOOT BAND

(75) Inventors: Takashi Ogino, Miyada-mura (JP); Hiroshi Ikeda, Miyada-mura (JP); Masahiro Kitamura, Tondabayashi (JP); Yasuo Ogata, Tondabayashi (JP)

(73) Assignee: NHK Spring Co., Ltd., Yokohama-Shi, Kanagawa (JP)

( * ) Notice: Subject to any disclaimer, the term of this patent is extended or adjusted under 35 U.S.C. 154(b) by 334 days.

(21) Appl. No.: 10/581,264

(22) PCT Filed: Nov. 30, 2004

(86) PCT No.: PCT/JP2004/017802

§ 371 (c)(1),
(2), (4) Date: Jun. 1, 2006

(87) PCT Pub. No.: WO2005/054689

PCT Pub. Date: Jun. 16, 2005

(65) Prior Publication Data

US 2007/0186387 A1    Aug. 16, 2007

(30) Foreign Application Priority Data

Dec. 1, 2003 (JP) ............................. 2003-402108

(51) Int. Cl.
*F16L 33/02* (2006.01)
*F16L 3/00* (2006.01)

(52) U.S. Cl. ................. 24/20 R; 24/20 TT; 24/20 CW; 24/20 EE

(58) Field of Classification Search ............... 24/20 CW, 24/20 R, 23 EE, 20 TT, 20 EE, 279, 280
See application file for complete search history.

(56) References Cited

U.S. PATENT DOCUMENTS

| 4,914,788 A | * | 4/1990 | Ojima | 24/20 R |
| 5,138,746 A | * | 8/1992 | Ojima et al. | 24/20 R |
| 6,178,601 B1 | * | 1/2001 | Craig, Jr. | 24/20 R |
| 2003/0101544 A1 | * | 6/2003 | Kitamura et al. | 24/20 CW |

FOREIGN PATENT DOCUMENTS

| JP | 59-80514 | 5/1984 |
| JP | 63-119726 | 5/1988 |
| JP | 7-35112 | 2/1995 |

* cited by examiner

*Primary Examiner*—Robert J Sandy
(74) *Attorney, Agent, or Firm*—Lowe Hauptman Ham & Berner, LLP

(57) ABSTRACT

A boot-band is configured to be surely fastened around a member and to be clamped, via a one-step operation, without any portion of the band body buckling during fastening. The boot-band includes a pressure-reduction arrangement that is formed in an outer-layer portion in such a manner that it reduces the pressure applied to engagement pawls of an inner-layer portion when the outer-layer portion climbs over the engagement pawls.

1 Claim, 9 Drawing Sheets

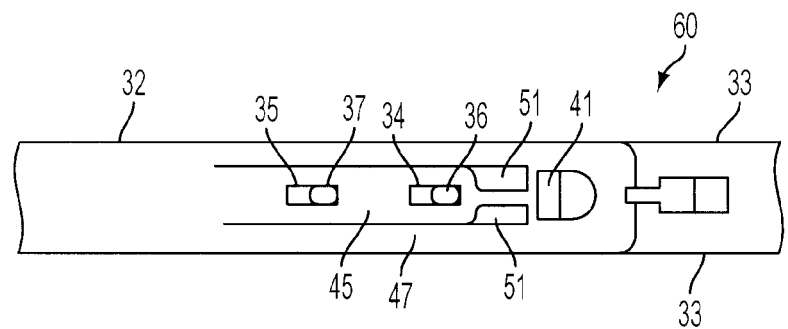
FIG. 11a
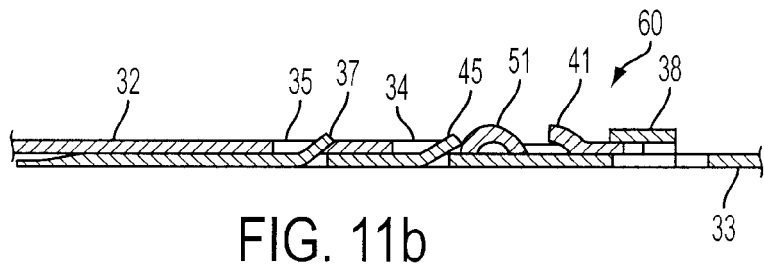
FIG. 11b
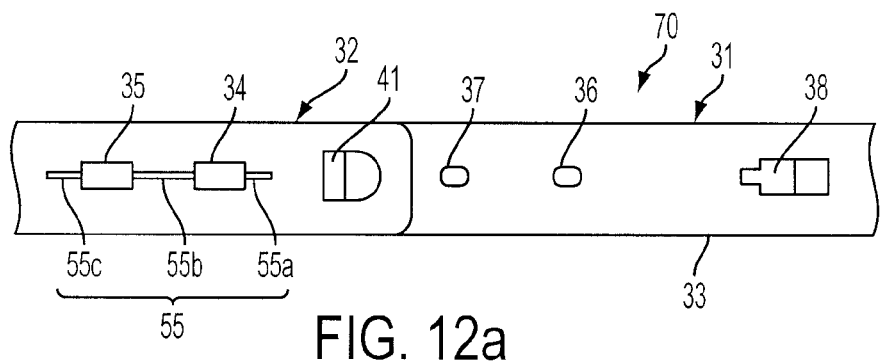
FIG. 12a
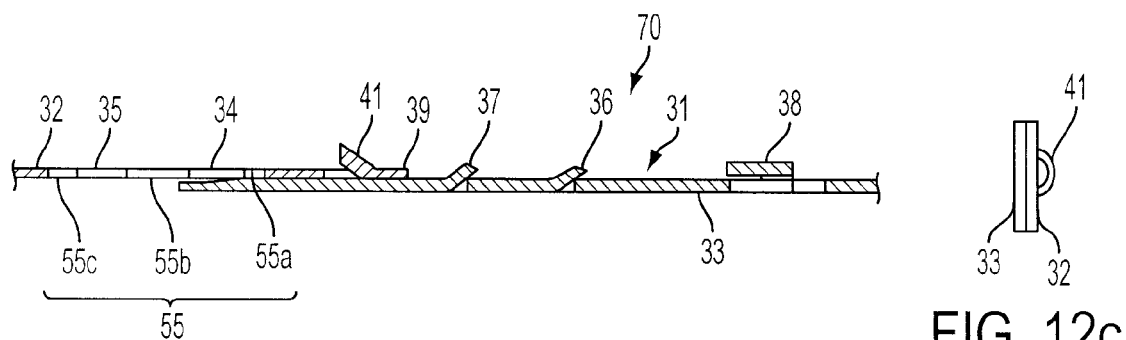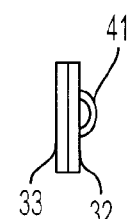
FIG. 12b
FIG. 12c

US 7,549,197 B2

BOOT BAND

FIELD OF THE INVENTION

The current invention relates to a boot-band, that fastens a boot, i.e., a tube-like or boot-like member made of rubber, resin, or the like, that is to be clamped to another member.

BACKGROUND OF THE INVENTION

A boot-band is used both for preventing internal grease and the like from flowing outside a boot and for preventing water or foreign matter from entering inside the boot, by fastening a boot that covers, for example, the power transmission part of an automobile. Because the boot-band is wound around the member to be clamped, the boot-band is usually provided with a pair of boot-band pawls, such that the boot-band can be fastened by applying a fastening tool to the pair of boot-band pawls.

FIGS. 15 and 16 show a first conventional boot-band 1 as described in the specification of Patent Document 1, and FIGS. 17 and 18 show a second conventional boot-band 2 as described in Patent Document 2. Both of the boot-bands 1 and 2 are composed of a band-body 3 that is made of a thin metallic plate and that is wound like a ring. Therefore, when the band body 3 is wound (around the member to be clamped), an outer-layer portion 4 of the band body 3 overlaps an inner-layer portion 5 of the band body 3. The boot and the member that is covered by the boot are placed inside of the ring formed by the boot-band before fastening is done.

In the first conventional boot-band 1, a first boot-band pawl 6 is formed on the outer-layer portion 4, while a second boot-band pawl 7, which to be paired with the first boot-band pawl 6 is formed on the inner-layer portion 5. Engagement holes 8 and 9 are formed in the outer-layer portion 4 in the area between the first boot-band pawl 6 and the longitudinal end (free end) of the outer-layer portion 4. The engagement hole 8 is longer than the engagement hole 9 is, and it is also used as a tack hole for tacking the band body 3. The second boot-band pawl 7, a tack hook 10, and engagement pawls 11, 12 are sequentially arranged on the inner-layer portion 5 in the lengthwise direction of the band body 3 (in the clockwise direction in FIG. 15)

After the boot-band 1 is wound like a ring as shown in FIG. 15, the second boot-band pawl 7 and the tack hook 10 are inserted into the engagement hole 8 of the outer-layer portion 4. Then, by a fastening tool (not illustrated), a pinching force F (see FIG. 16) is applied on the pair of boot-band pawls 6 and 7 in such a manner that the distance between the boot-band pawls 6 and 7 is reduced, which in turn simultaneously reduces the circumference of the boot band and the diameter of the ring formed by the band body. The force F pushes the boot-band pawl 6 into the boot-band pawl 7, simultaneously causing the engagement pawls 11 and 12 to be inserted into, and to be engaged with, the engagement holes 8 and 9, respectively, thus completing the fastening of the boot-band, while firmly maintaining the reduced diameter of the band body.

At this time, because the end section (i.e., the section near the engagement hole 9) of the outer-layer portion 4 tends to be pushed outwardly by the protruding engagement pawl 11, the end section must be pressed radially inward by the force shown as G in FIG. 16, in order to engage the engagement pawl 12 with the engagement hole 9 during the final stage of fastening.

As shown in FIGS. 17 and 18, in the second conventional boot-band 2, a first boot-band pawl 21 is formed on the top of the outer-layer portion 4 and at a location nearest to the longitudinally outer end of the outer-layer portion 4, and a second boot-band pawl 22 that is to be paired with the first boot-band pawl 21 is formed correspondingly on the inner-layer portion 5. Engagement holes 23, 24, and 25 are sequentially formed in the outer-layer portion 4 following the first boot-band pawl 21, and a second boot-band pawl 22, as well as engagement pawls 26, 27, and 28, respectively corresponding to the engagement holes 23, 24, and 25, are sequentially formed on the inner-layer portion 5.

The second boot-band pawl 22 is press-molded in such a manner as to protrude radially outward from the inner-layer portion 5, so that the second boot-band pawl 22 has an opening 22a to receive the first boot-band pawl 21. Also, the first boot-band pawl 21 in the outer-layer portion 4 has a pawl extension 29, which is to be inserted into the opening 22a of the second boot-band pawl 22.

As shown in FIG. 18, when the second conventional boot-band 2 is fastened, a pair of tool pawls 15a, 15b of a fastening tool 15 are applied to the boot-band pawls 21 and 22 by a force shown by F, and then the outer-layer and inner-layer portions 4 and 5 are pushed radially inward, resulting in a reduction of the diameter of the ring-like band body 3. At the time of this pushing in, while the pawl extension 29 is inserted into the opening 22a, the engagement pawls 26, 27, and 28 are engaged with their corresponding engagement holes 23, 24, and 25, respectively, and thus the fastening of the boot-band is completed.

[Patent Document 1] U.S. Pat. No. Re. No. 33744
[Patent Document 2] Japan Patent No. 3001266

In the first conventional boot-band 1, as is shown in FIGS. 15 and 16, a longitudinal force must be applied continuously to the band body 3 by a fastening tool in order to reduce the diameter of the ring, while an inward force must be applied, at the final stage of fastening only, on the outer-layer portion 4 in order to press the outer-layer portion 4 toward the inner-layer portion 5. Therefore, it is required to simultaneously perform two steps—namely, applying both longitudinal and inward forces—which results in a complex fastening process that involves a long operation time and reduced workability.

In contrast, in the second conventional boot-band 2, as is shown in FIGS. 17 and 18, the pawl extension 29 of the first boot-band pawl 21, which is located toward the longitudinally outer end of the outer-layer portion 4, is arranged near to the opening 22a of the second boot-band pawl 22, so that a radially inward-force operation for pressing the outer-layer portion 4 toward the inner-layer portion 5 is not necessary. That is, fastening can be done in one action of pulling in of the boot-band pawls 21 and 22, so that workability is better than that of the first conventional boot-band.

However, in the case of the second conventional boot-band 2, there is a problem that the inner-layer portion 5 might buckle during fastening.

FIG. 19 illustrates the mechanism that causes the buckling 19. A fastening force is applied on the two boot-band pawls 21 and 22, so that the outer-layer portion 4 slides over the inner-layer portion 5 after the pawl extension 29, which is the longitudinally outer end of the outer-layer portion 4, begins to be inserted into the opening 22a. This sliding makes the outer-layer portion 4 climb over the engagement pawls 26, 27, and 28 of the inner-layer portion 5; that is, the outer-layer portion 4 tries to slide with friction against the engagement pawls, the friction force being the greatest at the engagement pawl 26. In the process of such sliding, the outer-layer portion 4 tends to be locked by the friction force at the protruding part of the engagement pawl 26.

As a result of this locking, the force applied to the two boot-band pawls 21 and 22 is in reality applied to the engagement pawl 26 and the boot-band pawl 22, both of which are on the same inner-layer portion 5. As a result, the force for pushing in the outer-layer portion 4 and the inner-layer portion 5—force that should be consumed in the portion of the band body 3 between the two pawls 21 and 22—becomes a force pressing on a small portion of the inner-layer portion 5, between the engagement pawl 26 and the boot-band pawl 22. Then, when the strength of the fastening force exceeds the buckling-resistance limit of that small portion of the inner-layer portion 5, buckling 19 is generated between the engagement pawl 26 and the second boot-band pawl 22 of the inner-layer portion 5. When such buckling 19 occurs, the fastening strength for the member to be clamped becomes unstable and weak, so that the fastening is not secure.

DISCLOSURE OF THE INVENTION

The current invention has been created in view of the above-mentioned problems in the conventional boot-bands. Therefore, one objective of the current invention is to provide a boot-band that can be securely fastened around the member to be clamped without any portion of the band body being buckled during fastening. In addition, another objective of the current invention is to provide a boot-band that can be fastened by a one-step operation, so as to improve fastening workability.

For achieving the above-mentioned objectives, the boot-band described in Claim 1 comprises:

a band body that is wound like a ring around a member to be clamped, and that has an outer-layer portion and an inner-layer portion, respectively, at its two ends, with the outer-layer portion being overlaid over the inner-layer portion, engagement holes that are formed in the outer-layer portion, engagement pawls that are formed on, and that protrude outwardly from, the inner-layer portion and that are to be engaged with their corresponding engagement holes in the outer-layer portion so that the band body is maintained in a fastening state, a first boot-band pawl that is formed on the outer-layer portion nearer to the longitudinally outer end of the band body than the engagement holes are, a second boot-band pawl that is formed on the inner-layer portion and that is to be engaged with the first boot-band pawl, and a pressure-reduction means that is formed in the outer-layer portion in such a manner that said pressure-reduction means reduces the pressure applied on the engagement pawls of the inner-layer portion when the outer-layer portion climbs over the engagement pawls just before the first and the second boot-band pawls are engaged.

In a boot band according to one embodiment of the present invention, when the outer-layer portion climbs over the inner-layer portion during fastening of the band body, the pressure-reduction means formed in the outer-layer portion reduces the inward pressure on the inner-layer portion at the time of fastening. Therefore the outer-layer portion can slide over the inner-layer portion smoothly without extraordinary concentration of stress, so that problems like buckling of the inner-layer portion are prevented. Also the pressure-reduction means has a structure such that the outer-layer portion is displaced radially outward from the inner-layer portion when the outer-layer portion climbs over the engagement pawls.

Also, because the outer-layer portion elastically is displaced radially outward from the inner-layer portion, the inward pressure on the inner-layer portion is reduced, especially on the protruding part such as the engagement pawls that are on the inner-layer portion. Thereby the outer-layer portion can slide over the inner-layer portion with such a limited friction force that locking of the protruding part does not occur, so that the resultant pressing force on the protruding part does not exceed the buckling-resistance limit, as a result of which buckling of the inner-layer portion is prevented.

In the boot band according to the one embodiment of the present invention, the load-reduction means is structured such that an engagement-hole formation area, which is formed within the outer-layer portion and which contains the engagement holes, is separated—by cut lines along the longitudinal sides of said engagement-hole formation area—from the remaining, surrounding area of the outer-layer portion.

Also, because a part of the engagement-hole formation area of the outer-layer portion is separated from its periphery by the aforementioned cut lines, when the outer-layer portion climbs over the engagement pawls of the inner-layer portion and the engagement pawls are brought into contact with the engagement-hole formation area, the engagement-hole formation area is displaced outwardly in such a manner that this displacement of the engagement-hole formation area reduces the inward pressure on the inner-layer portion, so that buckling of the inner-layer portion is prevented.

Also, after the engagement-hole formation area displaces outwardly, it moves back inwardly by its own spring-back capability into its original state of moving along the inner-layer portion. Thereby, the engagement holes are automatically engaged with each other, so that such engagement makes the outer-layer portion and the inner-layer portion become mutually interconnected. Accordingly, fastening workability is improved.

In a boot band according to a second embodiment of the present invention, the load-reduction means is structured such that an engagement-hole formation area, which is formed within the outer-layer portion and which contains the engagement holes, is separated, by cut lines along the longitudinal sides of said engagement-hole formation area, from the remaining, surrounding area of said outer-layer portion, and whereby said engagement-hole formation area is elastically flexed toward the inner-layer portion.

Also, the engagement-hole formation area is flexed inwardly. But even with such flexing, at the time that the engagement pawls are brought into contact with the engagement-hole formation area, the engagement-hole formation area is displaced outwardly, so that the inward pressure on the inner-layer portion from the outer-layer portion is reduced, so that buckling of the inner-layer portion is prevented.

Also, after the engagement-hole formation area displaces outwardly, because the engagement-hole formation area has initially been elastically flexed inwardly, the engagement-hole formation area automatically returns to its original state and then contacts the inner-layer portion with pressure, so that the engagement holes are surely engaged with the engagement pawls. Accordingly, not only is fastening workability improved, but also the engagement holes can be moderately engaged with the engagement pawls.

In another variation of the second embodiment, the load-reduction means is structured such that an engagement-hole formation area, which is formed within the outer-layer portion and which contains the engagement holes, is separated, by cut lines along the longitudinal sides of engagement-hole formation area, from the remaining, surrounding area of the outer-layer portion, whereby said engagement-hole formation area further has a recoverable elastic sub-area that is connected with the remaining, surrounding area of the outer-layer portion.

Also, when the outer-layer portion climbs over the engagement pawl of the inner-layer portion, because the engagement-hole formation area is displaced elastically outwardly, the inward pressure on the inner-layer portion from the outer-layer portion is reduced, so that buckling of the inner-layer portion is prevented. At this time, the elastic part that is formed at the connecting location is deformed, aiding the displacement of the engagement-hole formation area, but the engagement-hole formation area is returned to the original state by its recovering force after completing the action of climbing over of the engagement pawl. Such recovery of the elastic part helps the engagement-hole formation area contact the inner-layer portion with additional pressure, so that the engagement pawl is engaged with the engagement hole more surely. Thereby, fastening workability is improved, while moderate engagement can be realized.

In a boot band according to another embodiment of the present invention, the pressure-reduction means are slits that are formed longitudinally in the outer-layer portion in such a manner that parts of the outer-layer portion are elastically raised on both sides of the slits by the engagement pawls that are being climbed over.

Also, when the outer-layer portion climbs over the engagement pawl of the inner-layer portion, the neighboring area of the slits in the outer-layer portion are elastically raised and displaced from the protruding part of the engagement pawl, so that the inward pressure on the inner-layer portion from the outer-layer portion is reduced, with the result that buckling of the inner-layer portion is prevented.

BRIEF DESCRIPTION OF THE DRAWINGS

FIGS. 8(a) and (b) are, respectively, a plane view and a sectional view showing a state before fastening in.

FIGS. 11(a) and (b) are, respectively, a plane view and a sectional view showing Embodiment 3 after fastening is completed.

FIGS. 12(a), (b) and (c) are, respectively, a plane view, a sectional view, and an end view showing Embodiment 4 before fastening.

Figure 1A:
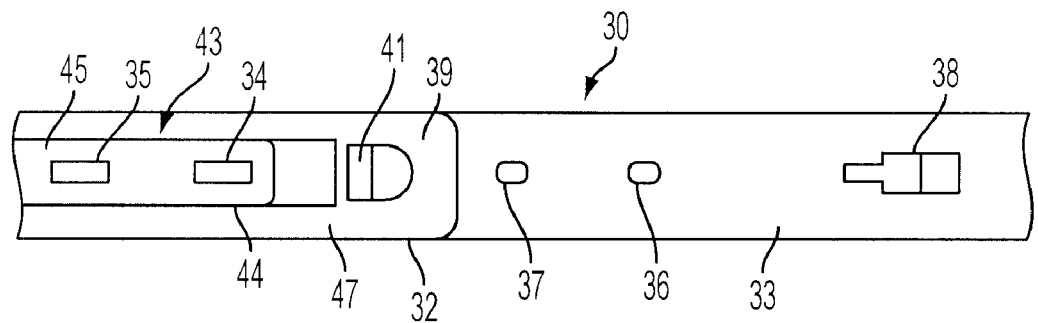
FIGS. 1(a) and (b) are, respectively, a plane view and a sectional view showing Embodiment 1 before fastening.

NUMBERS USED IN THE DRAWINGS 30, 50, 60, 70 Boot-band
31 Band body
32 Outer-layer portion
33 Inner-layer portion
34, 35 Engagement hole
36, 37 Engagement pawl
38 Second boot-band pawl
39 Pawl extension
41 First boot-band pawl
44 Cut line
45 Engagement-hole formation area
47 Fastening-piece area
49 Curved part
51 Elastic part
55 Slit

BEST MODES FOR CARRYING OUT THE INVENTION

The current invention will now be explained in detail with reference to the drawings of the embodiments. For each embodiment, the corresponding members have the same numbers.

Embodiment 1

Figure 1B:
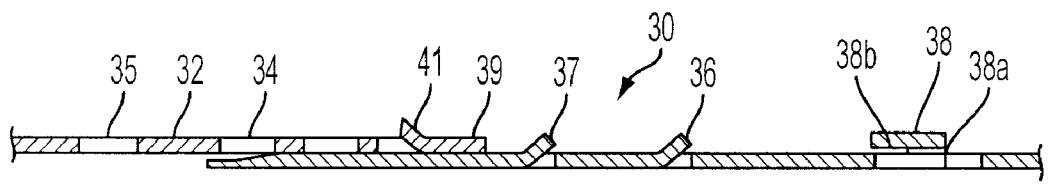
Figure 2A:
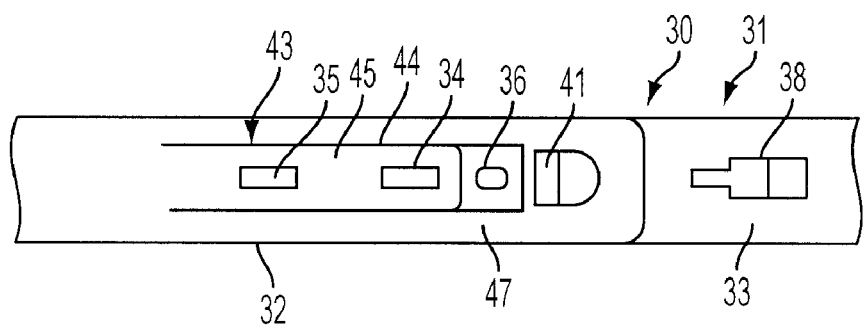
FIGS. 2(a) and (b) are, respectively, a plane view and a sectional view showing Embodiment 1 during fastening.
Figure 2B:
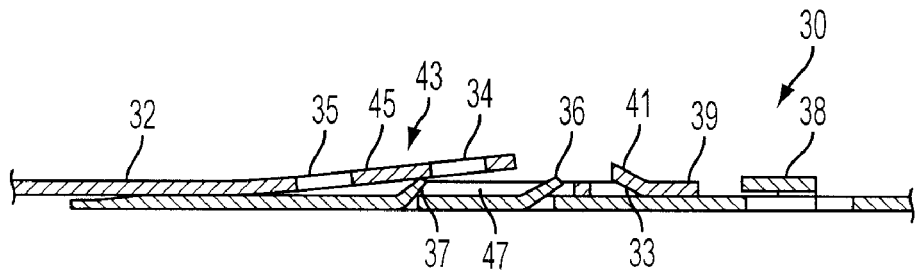
Figure 3:
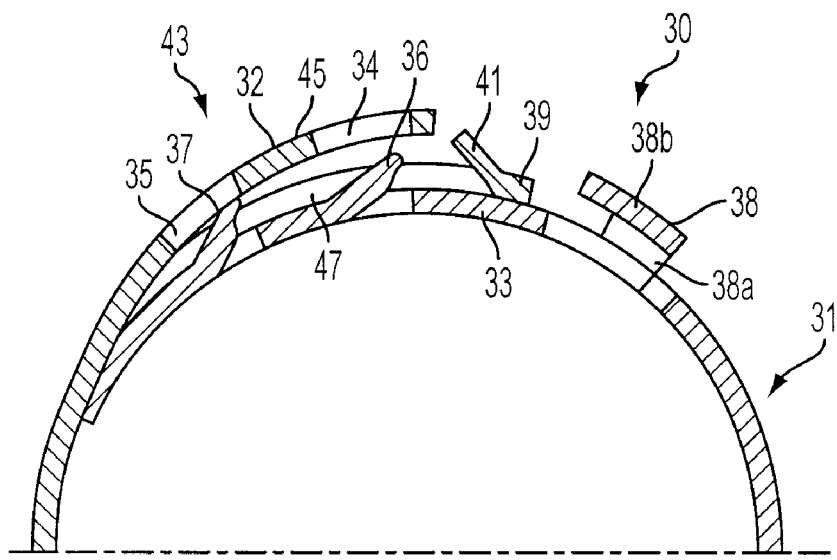
FIG. 3 is an overall sectional view showing Embodiment 1 during fastening.
Figure 4A:
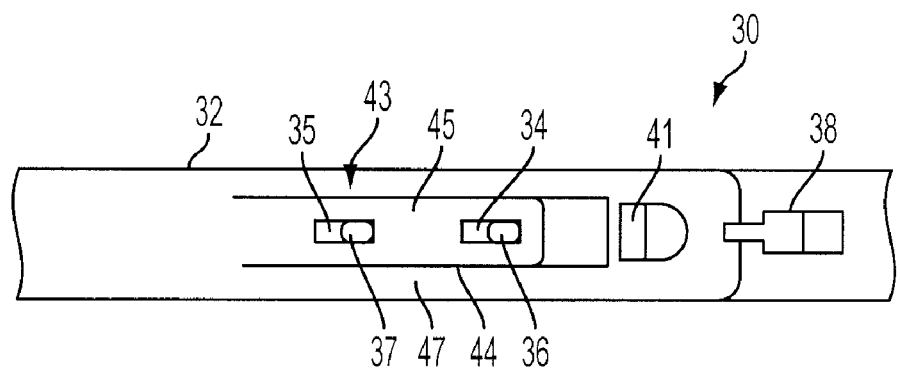
FIGS. 4(a) and (b) are, respectively, a plane view and a sectional view showing Embodiment 1 after fastening is completed.
Figure 4B:
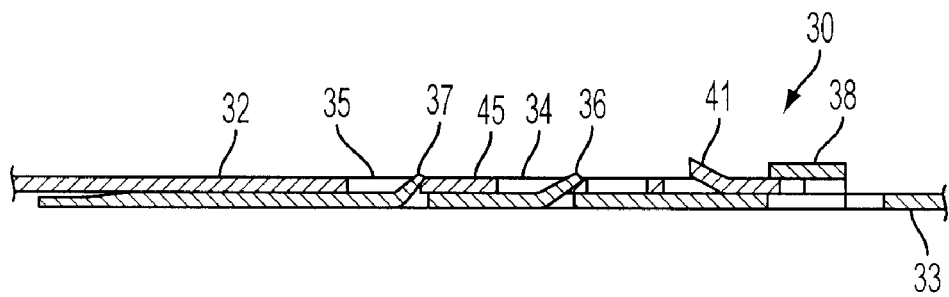
Figure 5:
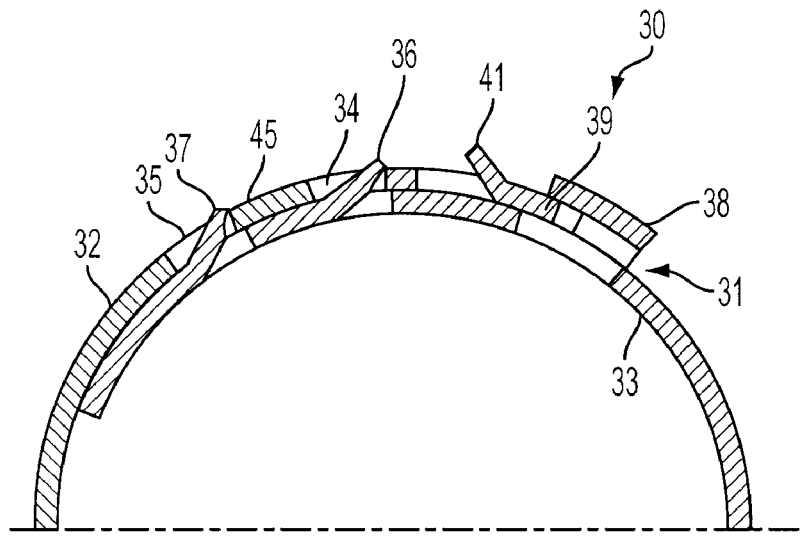
FIG. 5 is an overall sectional view showing Embodiment 1 after fastening is completed.

FIGS. 1 to 5 show a boot-band 30 in Embodiment 1 of the present invention. FIG. 1 shows the boot-band 30 before fastening, FIGS. 2 and 3 show intermediate states during fastening, while FIGS. 4 and 5 show the boot-band 30 after fastening has been completed.

The boot-band 30 is formed of a belt-like band body 31. The band body 31 is first formed into a belt-like shape by press-punching and slit-processing a thin metallic plate, then is formed into a ring-like shape by being wound. The band body 31 is used for fastening a member (not illustrated) that is to be clamped to another member. The band body 31 that is wound like a ring has, as its respective ends, an outer-layer portion 32 and an inner-layer portion 33, with the outer-layer portion 32 being overlaid over the inner-layer portion 33. As mentioned below, the outer-layer portion 32 and inner-layer portion 33 are pulled in opposite directions so as to reduce the diameter of the ring, so that the member to be clamped is fastened.

A first boot-band pawl 41 is formed on the longitudinally end section (the free end side) of the outer-layer portion 32 of the band body 31 in a manner so as to be raised outwardly in the radial direction. Also, a pawl extension 39 extends longitudinally from the first boot-band pawl 41 toward the end of the outer-layer portion 32. That is to say, the pawl extension 39 is formed so as to face a below-mentioned second boot-band pawl 38 that is formed on the inner-layer portion 33. The pawl extension 39 is formed in a planar shape, so that it can be smoothly inserted into the second boot-band pawl 38.

Furthermore, engagement holes 34, 35 are sequentially formed in the outer-layer portion 32 in the longitudinal direction from the end of said outer-layer portion 32. The engagement holes 34, 35 are formed at the approximate width-wise center of the outer-layer portion 32 and are elongated longitudinally. The engagement holes 34, 35 are to be engaged with the below-described engagement pawls 36, 37, so as to maintain the band body 31 in a fastened state.

The engagement pawls 36, 37 are formed in the inner-layer portion 33 of the band body 31 in the longitudinal direction, and a second boot-band pawl 38 to be paired with the first boot-band pawl 41 is formed adjacent to these engagement pawls 36, 37. The engagement pawls 36, 37 are formed so as to protrude from the band body 31, slanting so as to face the second boot-band pawl 38. These engagement pawls 36, 37 are to be inserted into, and engaged with, the engagement holes 34, 35 of the outer-layer portion 32.

The second boot-band pawl 38 also is formed so as to protrude from the inner-layer portion 33. The second boot-band pawl 38 has an opening 38a and a lid part 38b, as shown in FIGS. 1 and 3. The opening 38a is opened toward the first boot-band pawl 41, into which the above-mentioned pawl extension 39 of the first boot-band pawl 41 is to be inserted. The lid part 38b is connected with the inner-layer portion 33 at the opposite side of the opening 38a, and thus presses the pawl extension 39 inwardly so as to hold the pawl extension 39 when the pawl extension 39 is inserted into the opening 38a.

Furthermore, the boot-band 30 is provided with a pressure-reduction means that reduces the pressure on the inner-layer portion 33 when the outer-layer portion 32 climbs over the engagement pawls 36, 37 of the inner-layer portion 33. In this embodiment, the pressure-reduction means is formed by partially separating an engagement-hole formation area from the remaining area of the outer-layer portion 32. Here, the engagement-hole formation area is within the outer-layer portion 32 as an area that has predetermined longitudinal and transversal lengths and that contains the engagement holes 34 and 35.

Concretely, the engagement-hole formation area 45 is partially separated from the remaining, surrounding area of the outer-layer portion by cut lines 44, which are formed along the boundary of the engagement-hole formation area 45. In this embodiment, the cut lines run along both longitudinal sides of the boundary and along the front transversal side (the nearest side to the first boot-band pawl 41), thus leaving two fastening-piece areas 47, one on each longitudinal side of the engagement-hole formation area 45.

Figure 18:
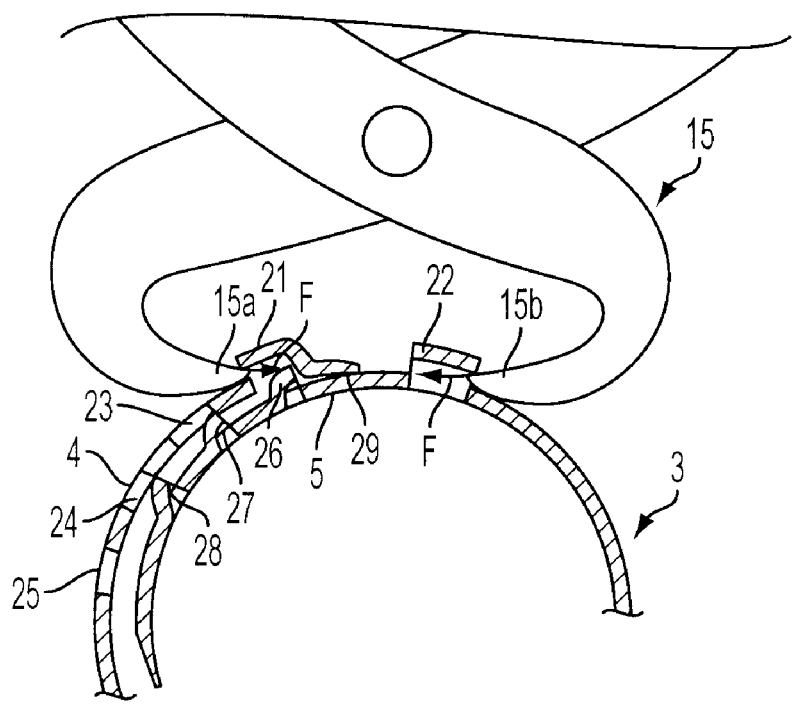
FIG. 18 is an overall sectional view showing the second conventional boot-band during fastening.
Figure 19:
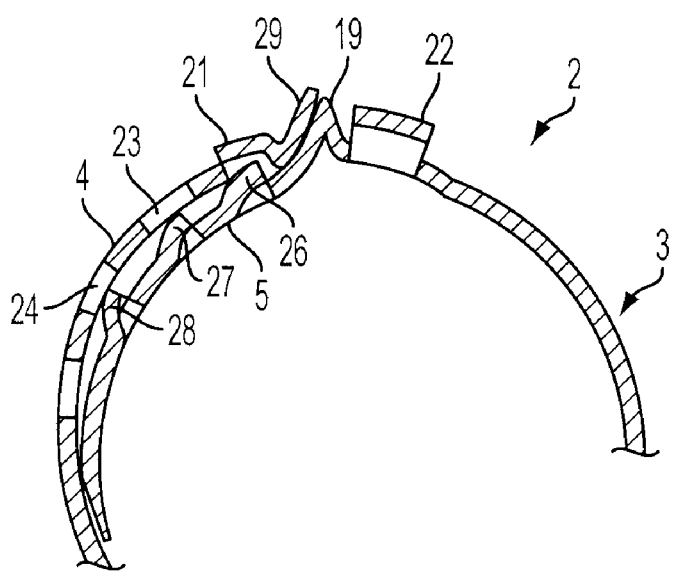
FIG. 19 is a sectional view that illustrates the mechanism that causes buckling of the second conventional boot-band.

As shown in FIG. 18, when a fastening force F is applied to the first and second boot-band pawls 41 and 38 by a tool like a fastening tool 15, the fastening force is conveyed mainly by the fastening-piece area 47, while the engagement-hole formation area 45 that is separated from the fastening piece part 47 via the cut lines 44 can be displaced outwardly from the inner-layer portion 33. Thus, when the engagement-hole formation area 45 climbs over the engagement pawl 37 of the inner-layer portion 33, such escaping displacement reduces the pressure on the inner-layer portion 33 from the outer-layer portion 32. Therefore, buckling of the inner-layer portion 33 is prevented.

Next, the fastening operation of the boot-band 30 in this embodiment will be explained in detail. FIG. 1 shows the state before fastening, in which the boot-band 30 is wound like a ring in a manner so that the outer-layer portion 32 overlies the inner-layer portion 33, surrounding the member to be clamped (not depicted). In this state, a fastening tool (see the fastening tool 15 in FIG. 18) is hooked to both the first boot-band pawl 41 and the second boot-band pawl 38, and is then used to push both the outer-layer portion 32 and the inner-layer portion 33 longitudinally inward.

FIGS. 2 and 3 show intermediate states during fastening of the band body 31. When the two ends of the outer-layer portion 32 and inner-layer portion 33 are sufficiently pulled in toward each other, the outer-layer portion 32 climbs over the engagement pawl 36, and then over the engagement pawl 37, of the inner-layer portion 33. At the time of this climbing over, when the engagement pawls 37, 36 (in case of FIGS. 2 and 3, the engagement pawl 37) are brought into contact with the outer-layer portion 32, the engagement-hole formation area 45 of the outer-layer portion 32 is pushed up, i.e., displaced outwardly, by the engagement pawl 37. Such displacement of the engagement-hole formation area 45 reduces the pressure applied on the inner-layer portion 33 from the outer-layer portion 32. Thereby, the pressure that is applied on the inner-layer portion 33 is not strong enough to exceed the buckling-resistance limit of the inner-layer portion 33, and so the inner-layer portion 33 does not buckle.

Moreover, the fastening force is conveyed mainly via the fastening-piece area 47, so that fastening of the band body 31 continues, and the outer-layer portion 32 continues to slide over the inner-layer portions 33. By this sliding, the pawl extension 39 on the longitudinally outer end of the first boot-band pawl 41 is inserted into the opening 38a of the second boot-band pawl 38, and is prevented from being detached by the lid part 38b.

FIGS. 4 and 5 show the state after fastening is completed. At this final state, the engagement-hole formation area 45 moves back inwardly by its own spring-back capability into a form that conforms to that of the inner-layer portion 33. Thereby, the engagement holes 34, 35 are automatically engaged with the engagement pawls 36, 37, so that the outer-layer portion 32 and the inner-layer portion 33 are fixed to each other. In addition, if the spring-back capability of the engagement-hole formation area 45 is not sufficient, the engagement-hole formation area 45 can be pressed inwardly toward the inner-layer portion 33, getting a fixing of the engagement holes 34, 35 with the engagement pawls 36, 37.

In this embodiment, when the outer-layer portion 32 climbs over the engagement pawls 36, 37 due to fastening of the band body 31, the engagement-hole formation area 45 is displaced outwardly (that is, in the radially outward direction), so that the pressure applied on the inner-layer portion 33 from the outer-layer portion 32 is reduced, and thus buckling of the inner-layer portion 33 is prevented. Also, when the band body 31 is fastened, the engagement-hole formation area 45, due to its aforementioned spring-back capability, is in such a form along the inner-layer portion 33 that the engagement holes 34, 35 are automatically engaged with, and kept engaged with, the engagement pawls 36, 37, so that fastening workability is improved.

Also, in this embodiment, because the pawl extension 39 on the end of the first boot-band pawl 41 is inserted into the second boot-band pawl 38, the longitudinally outer end of the outer-layer portion 32 take close contact with the inner-layer portion 33. In addition, because the first boot-band pawl 41 is arranged near the pawl extension 39 at the longitudinally outer end of the outer-layer portion 32, and at a position near the second boot-band pawl 38, fastening becomes possible with one pressing action, so that fastening workability is further improved.

Embodiment 2

Figure 6A:
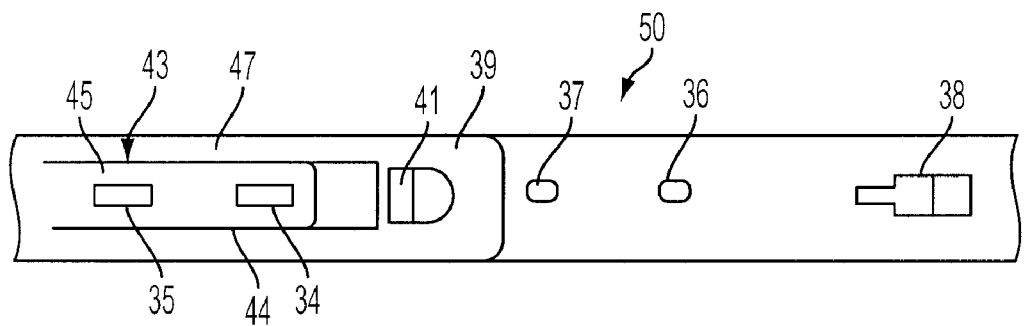
FIGS. 6(a) and (b) are, respectively, a plane view and a sectional view showing Embodiment 2 before fastening.
Figure 6B:
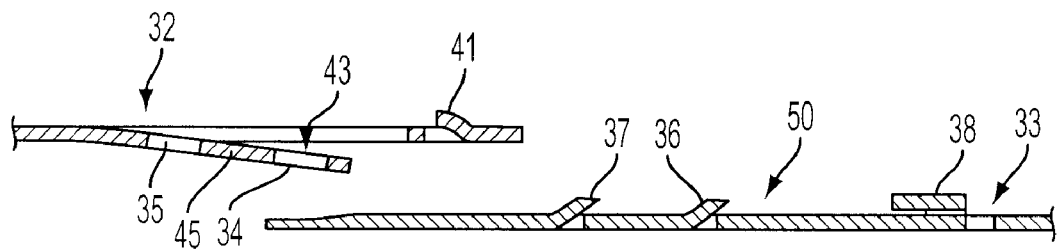

FIG. 6 shows a boot-band 50 in Embodiment 2 of the present invention. In the boot-band 50 according to this embodiment, as is similar to Embodiment 1, the engagement-hole formation area 45 of the outer-layer portion 32 is partially separated from the peripheral, fastening piece part 47 via cut lines 44.

In addition, the partially separated, engagement-hole formation area 45 is elastically flexed, slanting radially inwardly (in the direction of the inner-layer portion 33). In such an elastically flexed state, when the band body 31 begins to be fastened, and when the outer-layer portion 32 climbs over the engagement pawls 36, 37 of the inner-layer portion 33, the engagement-hole formation area 45 is displaced outwardly (in the radially outward direction of the band body 31). Therefore, the pressure applied on the inner-layer portion 33 from the outer-layer portion 32 is reduced, so that buckling of the inner-layer portion 33 is prevented.

Also, after the fastening is sufficient and the outer-layer portion 32 climbs over the engagement pawls 36, 37, the engagement piece part 45 returns automatically by the spring-back capability of the outer-layer portion 32, so that the engagement holes 34, 35 are engaged with the engagement pawls 36, 37. Thereby, not only is fastening workability improved, but also the engagement holes 34, 35 are moderately engaged with the engagement pawls 36, 37, so that a user can tell that the fastening has been completed.

Figure 7A:
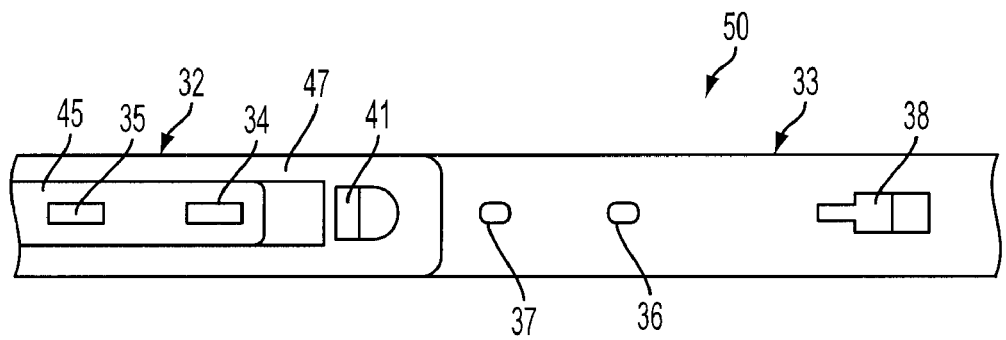
FIGS. 7(a) and (b) are, respectively, a plane view and a sectional view showing of a variation of Embodiment 2 before fastening.
Figure 7B:
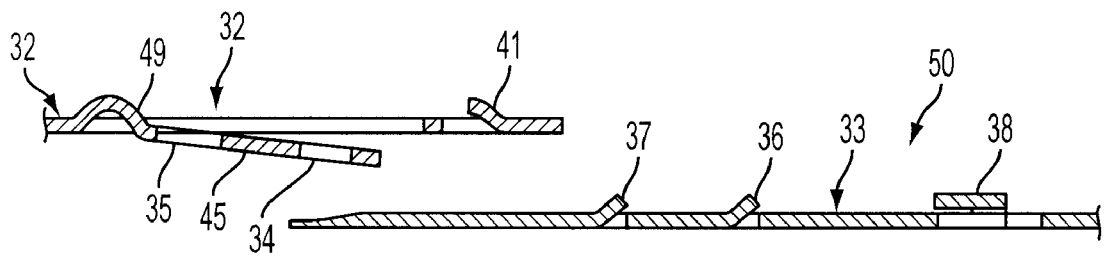

FIG. 7 shows a variation of Embodiment 2. In this variation, as an example of a recoverable elastic sub-area, a curved part 49 that is curved radially outwardly is formed on the rear transversal side (the side farthest from the first boot-band pawl 41) of the engagement-hole formation area 45. The engagement-hole formation area 45 is connected with the remaining area of the outer-layer portion 32 via the curved part 49, so that the curved part 49 gives additional elasticity to the engagement-hole formation area 45, which, as a result, has the merit that during the fastening operation it can be smoothly displaced and can smoothly return inwardly.

Embodiment 3

Figure 8A:
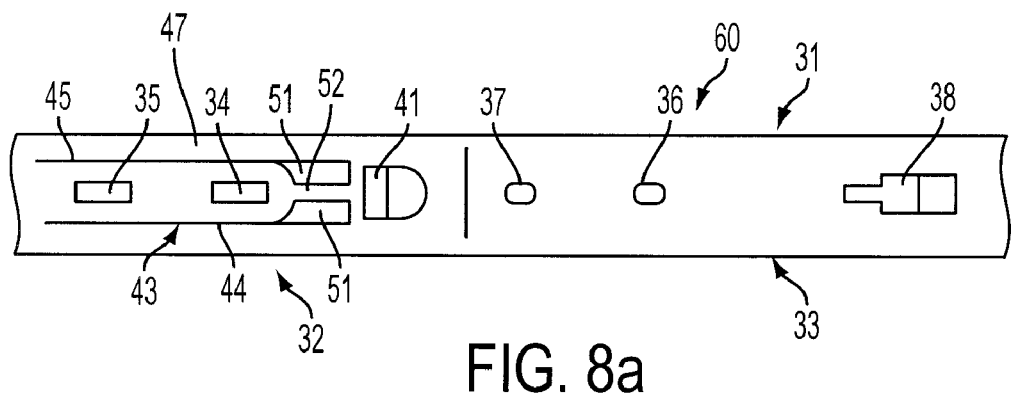
Figure 8B:
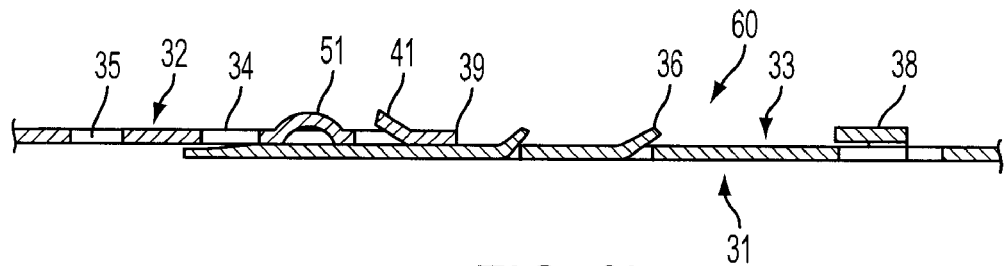
Figure 9A:
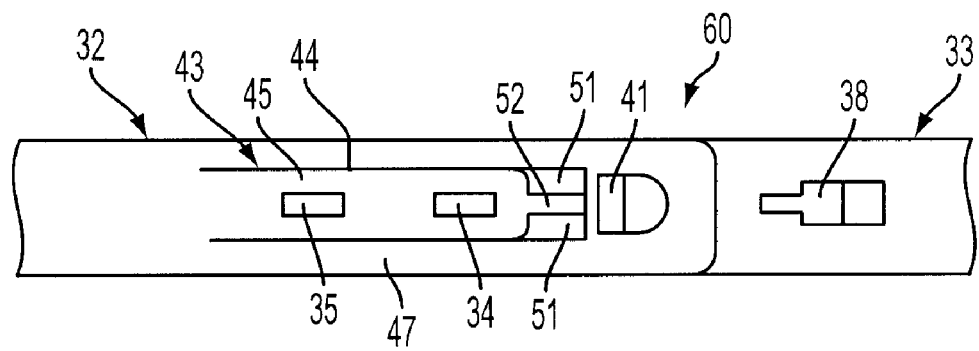
FIGS. 9(a) and (b) are, respectively, a plane view and a sectional view showing Embodiment 3 during fastening.
Figure 9B:
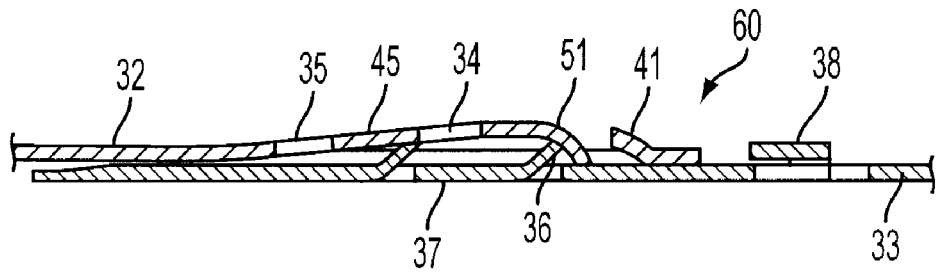
Figure 10:
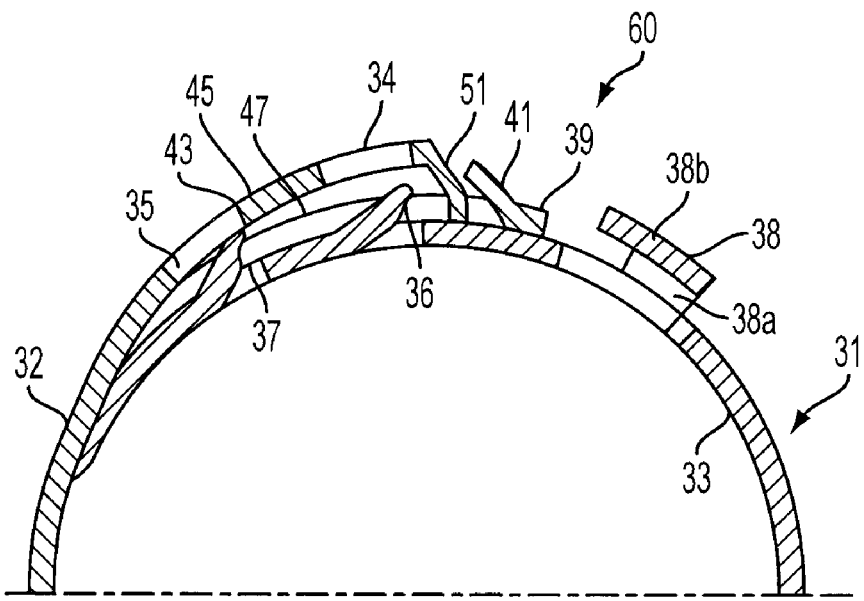
FIG. 10 is an overall sectional view showing Embodiment 3 during fastening.

FIGS. 8 to 11 show a boot-band 60 in Embodiment 3 of the present invention. FIG. 8 shows the state before fastening, FIGS. 9 and 10 show intermediate states during fastening, while FIG. 11 shows the state after fastening has been completed.

In this embodiment, too, an engagement-hole formation area 45 of the outer-layer portion 32 is separated from the peripheral, fastening piece parts 47 via cut lines 47 on the longitudinal sides.

In this embodiment, however, as another example of a recoverable elastic sub-area, elastic parts 51 are formed on the front transversal-side boundary (the side nearest to the first boot-band pawl 41) of the engagement-hole formation area 45, each in a curved form protruding radially outwardly. A pair of elastic parts 51 are formed near the ends of the front transversal-side boundary, while a connection part 52 that is connected with the longitudinally outer-end portion of the outer-layer portion 32, is formed between the pair of elastic parts 51. In this case, the elastic parts 51 are curved outwardly to provide a spring property to them, so that they can return to their original state even when they are deformed.

In this embodiment, too, before fastening, the band is wound like a ring so that the outer-layer portion 32 is overlaid over the inner-layer portion 33 on the outside side of the member to be clamped. In this state, the fastening tool is hooked to the first boot-band pawl 41 and the second boot-band pawl 38, and then the outer-layer portion 32 and the inner-layer portion 33 are pushed in the boot-band's diameter-reducing direction for fastening.

By such fastening, when the outer-layer portion 32 climbs over the engagement pawl 36, and then over the engagement pawl 37, of the lower overlaid portion 33, the engagement piece part 45 is pushed up by the engagement pawl 37 and is displaced outwardly (in the radially outward direction) as shown in FIGS. 9 and 10. At this time, the elastic parts 51 are deformed in a manner so as to extend from a curved state for storing a return torque. In this manner, when the engagement piece part 45 is displaced in the radially outward direction, the pressure applied on the inner-layer portion 33 from the outer-layer portion 32 is reduced, so that the inner-layer portion 33 does not buckle, because the applied pressure can be controlled so as not to surpass the buckling-resistance limit of the inner-layer portion 33.

Thereafter, when the outer-layer portion 32 climbs over the engagement pawls 37, 36, and fastening is sufficient, the elastic parts 51 return to their original state due to their spring property, so that the engagement-hole formation area 45 is closely overlaid along the inner-layer portion 33, as shown in FIG. 11. Thereby, the engagement holes 34, 35 are moderately engaged with the engagement pawls 36, 37, thus firmly fastening the member to be clamped.

Also, after fastening, the pawl extension 39 on the longitudinally outer end of the first boot-band pawl 41 is inserted into the opening 38a of the second boot-band pawl 38, and is prevented from disengagement by the lid part 38b.

In this embodiment, not only is buckling, which might be generated at the inner-layer portion 33, prevented, but also the engagement holes 34, 35 are automatically engaged with the engagement pawls 36, 37 by elastic returning of the elastic parts 51, so that fastening workability is improved, and moderate engagement results, notifying a user that fastening has been completed.

Embodiment 4

Figure 13A:
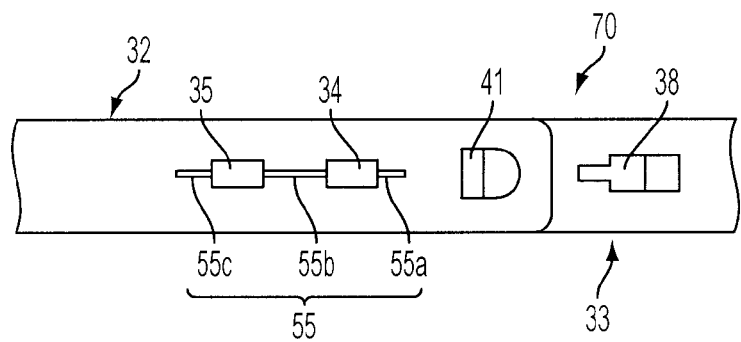
FIGS. 13(a), (b) and (c) are, respectively, a plane view, a sectional view, and a transversal sectional view showing Embodiment 4 during fastening.
Figure 13B:
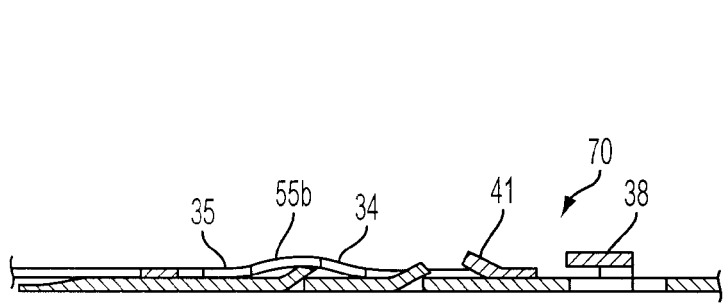
Figure 13C:
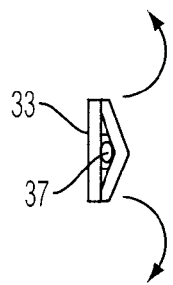
Figure 14A:
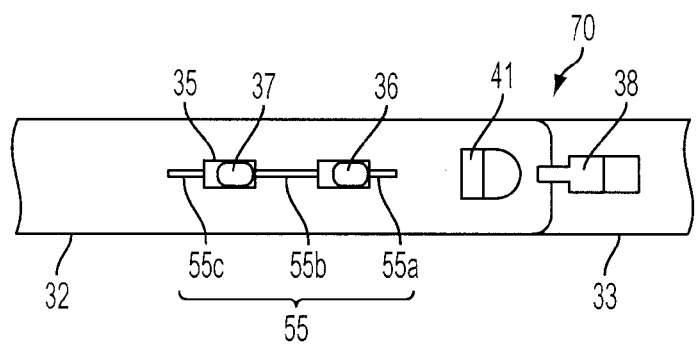
FIGS. 14(a), (b) and (c) are, respectively, a plane view, a sectional view, and a transversal sectional view showing Embodiment 4 after fastening is completed.
Figure 14B:
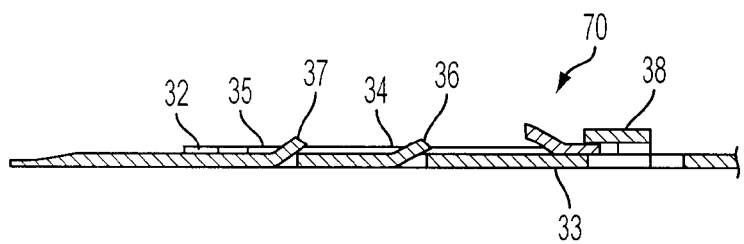
Figure 14C:
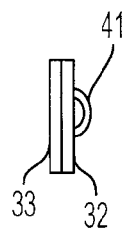
Figure 15:
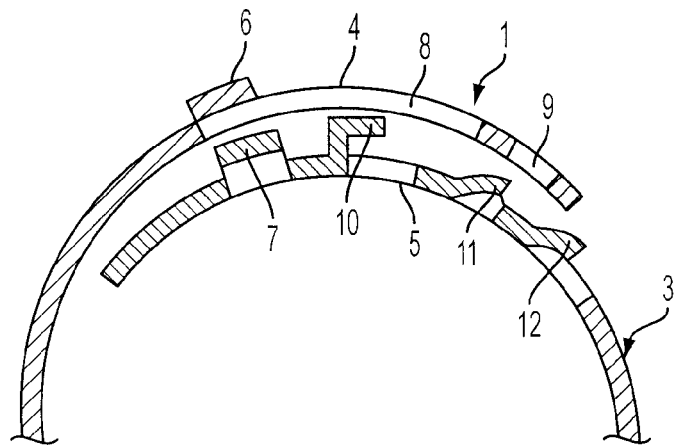
FIG. 15 is an overall sectional view showing the first conventional boot-band before fastening.
Figure 16:
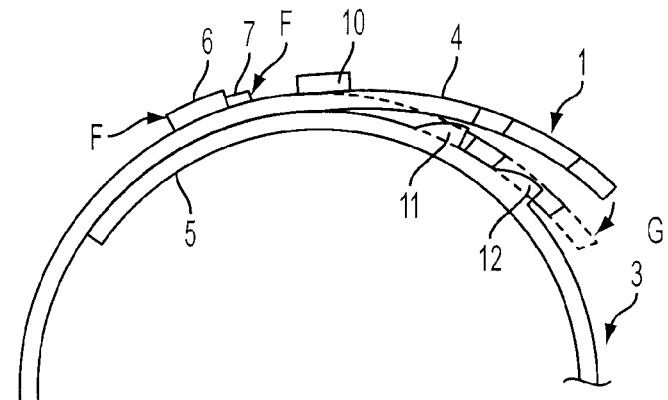
FIG. 16 is an overall side view showing the first conventional boot-band during fastening.
Figure 17:
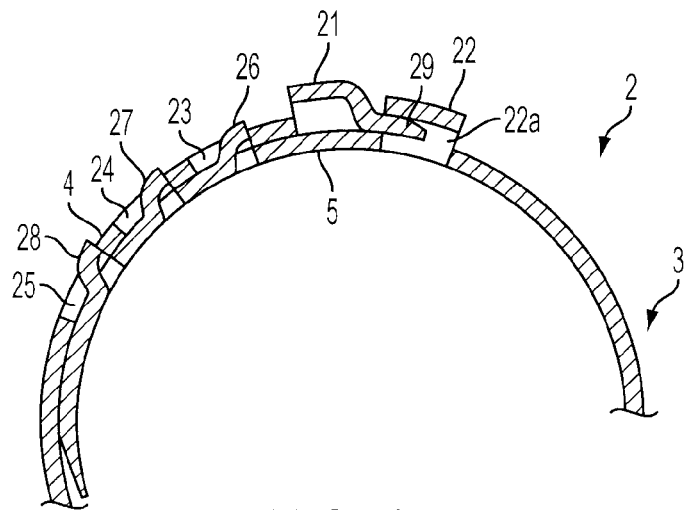
FIG. 17 is an overall sectional view showing the second conventional boot-band after fastening is completed.

FIGS. 12 to 14 show a boot-band 70 in Embodiment 4 of the present invention. FIG. 12 shows the state before fastening, FIG. 13 shows an intermediate state, and FIG. 14 shows the state after fastening has been completed.

In the boot-band 70 of this embodiment, the pressure-reduction means is provided by slits 55, which are formed in the outer-layer portion 32. The slits 55, which are formed so as to extend longitudinally along the center of the outer-layer portion 32, consists of a first slit 55a that extends from the engagement hole 34 half-way toward the first boot-band pawl, a second slit 55b that connects the engagement hole 34 and the engagement hole 35, and a third slit 55c that extends from the engagement hole 35 half-way in the rear direction. In this manner, the slits 55 are formed in the outer-layer portion 32, so that the area surrounding the slits 55 in the outer-layer portion 32 can be elastically deformed.

In this embodiment, too, the band body 31 starts to be fastened as shown in FIG. 12. When the outer-layer portion 32 climbs over the engagement pawls 37, 36 of the lower overlaid portion 33, as shown in FIG. 13, the peripheral area of the slits 55 acts to deform slanting so as to be displaced from the protruding engagement pawls 36, 37. Such a displacement due to deformation reduces the pressure that the outer-layer portion 32 applies to the inner-layer portion 33. Therefore, the applied pressure can be controlled so as not to surpass the buckling-resistance limit of the inner-layer portion 33, so that the inner-layer portion 33 does not buckle.

When fastening is further continued, the outer-layer portion 32 completes climbing over the engagement pawls 36, 37, as shown in FIG. 14, the area surrounding the slits 55 returns to its original form of contacting along the inner-layer portion 33, while the engagement holes 34, 35 are engaged with the engagement pawls 36, 37. Thereby, the member to be clamped can be fastened sufficiently.

INDUSTRIAL APPLICABILITY

The current invention prevents problems like buckling of the inner-layer portion when the band body is being fastened, and the member to be clamped can be securely and surely fastened. Furthermore, the structure is such that the engagement holes of the outer-layer portion automatically engage with the engagement pawls of the inner-layer portion in a one-step operation, so that fastening workability also is improved.

What is clamed is:

1. A boot-band comprising a band body that is wound like a ring around a member to be clamped, and that has an outer-layer portion and an inner-layer portion, respectively, at its two ends, with the outer-layer portion being overlaid over the inner-layer portion, engagement holes that are formed in the outer-layer portion, engagement pawls that are formed on, and that protrude outwardly from, the inner-layer portion and that are to be engaged with their corresponding aforementioned engagement holes so that the band body is held in a fastened state, a first boot-band pawl that is formed on the outer-layer portion nearer to the longitudinally outer end of the band body than are the engagement holes are, a second boot-band pawl that is formed on the inner-layer portion and that is to be engaged with the first boot-band pawl, and a pressure-reduction arrangement that is formed in the outer-layer portion in such a manner that said pressure-reduction arrangement reduces the pressure applied on the engagement pawls of the inner-layer portion when the outer-layer portion climbs over the engagement pawls just before the first and the second boot-band pawls are engaged, wherein said pressure-reduction arrangement is structured such that an engagement-hole formation area, which is formed within the outer-layer portion and which contains the engagement holes, is separated, by cut lines along the longitudinal sides of said engagement-hole formation area, from the remaining, surrounding area of the outer-layer portion, and that said engagement-hole formation area rises up from said inner-layer portion.

* * * * *